(12) United States Patent
Simard

(10) Patent No.: US 11,547,234 B2
(45) Date of Patent: Jan. 10, 2023

(54) HAND TOOL FOR CUTTING AND CORING AN AVOCADO AND A METHOD OF USING SAME

(71) Applicant: Jo-Anne Simard, Blainville (CA)

(72) Inventor: Jo-Anne Simard, Blainville (CA)

(73) Assignee: Jo-Anne Simord, Blainville (CA)

( * ) Notice: Subject to any disclaimer, the term of this patent is extended or adjusted under 35 U.S.C. 154(b) by 0 days.

(21) Appl. No.: 16/920,706

(22) Filed: Jul. 4, 2020

(65) Prior Publication Data

US 2021/0038010 A1 Feb. 11, 2021

(30) Foreign Application Priority Data

Jul. 5, 2019 (GB) ...................... 1909718

(51) Int. Cl.
*A47J 25/00* (2006.01)
*B26D 3/26* (2006.01)

(52) U.S. Cl.
CPC ................ *A47J 25/00* (2013.01); *B26D 3/26* (2013.01)

(58) Field of Classification Search
CPC .. A47J 25/00; A47J 17/04; A47J 43/28; A47J 23/00; B26D 3/26; B26B 13/00; B26B 27/002; B27B 27/00; B47J 17/02
USPC ...... 30/113.2, 253, 230, 114, 355, 229, 366, 30/124, 278, 165, 314, 279.6, 280, 303, 30/316, 113.1, 113.3; 99/837, 842, 545, 99/584, 588, 538; 15/160; 241/83; D7/672, 673, 368, 669; 81/9.4, 318–321, 81/9.44, 90.1; 7/132, 125, 129, 130
See application file for complete search history.

(56) References Cited

U.S. PATENT DOCUMENTS

| | | | | | |
|---|---|---|---|---|---|
| 104,453 | A * | 6/1870 | Haviland | ................... | B67B 7/30 30/142 |
| 221,622 | A * | 11/1879 | Sly | ........................... | B25B 7/22 7/131 |
| 921,801 | A * | 5/1909 | Clauss | ..................... | A24F 13/26 30/112 |
| 1,178,684 | A * | 4/1916 | Shimoda | .................. | A47J 25/00 30/113.2 |
| 1,455,323 | A * | 5/1923 | Cummins | ............... | A47J 23/00 30/113.2 |
| 1,531,903 | A * | 3/1925 | Cummins | ............... | A47J 23/00 30/113.2 |
| 2,113,500 | A * | 4/1938 | Stathem | .................. | A47J 23/00 99/584 |
| 2,675,843 | A * | 4/1954 | Jarvis | ...................... | A47J 23/00 99/537 |
| 3,015,160 | A * | 1/1962 | Fogle | ........................ | A01G 5/00 30/232 |
| 6,637,116 | B1 * | 10/2003 | Hill | ......................... | B26B 13/00 30/114 |

(Continued)

*Primary Examiner* — Ghassem Alie

(57) ABSTRACT

The hand tool has a pair of hand tool elements pivotally joined at one distal end thereof. Each hand tool element has an elongated configuration having a handle portion, a tool portion extending distally away from the handle portion, and a concave blade extending sidewardly and oppositely inwardly relative to one another along each tool portion. Furthermore, each hand tool element has a cutting edge along at least one portion of each concave blade, and at least one avocado seed engaging portion located along, and protruding substantially radially distally away from, each concave blade.

2 Claims, 5 Drawing Sheets

(56) References Cited

U.S. PATENT DOCUMENTS

| | | | | |
|---|---|---|---|---|
| 7,210,378 B1* | 5/2007 | Bibi | ............................ | B25B 7/02 |
| | | | | 81/9.41 |
| 10,842,308 B2* | 11/2020 | Krus | ......................... | A47J 25/00 |
| 2015/0135539 A1* | 5/2015 | Harris | ....................... | A47J 17/02 |
| | | | | 30/122 |
| 2016/0181772 A1* | 6/2016 | Liao | ...................... | H02G 1/1214 |
| | | | | 7/107 |

* cited by examiner

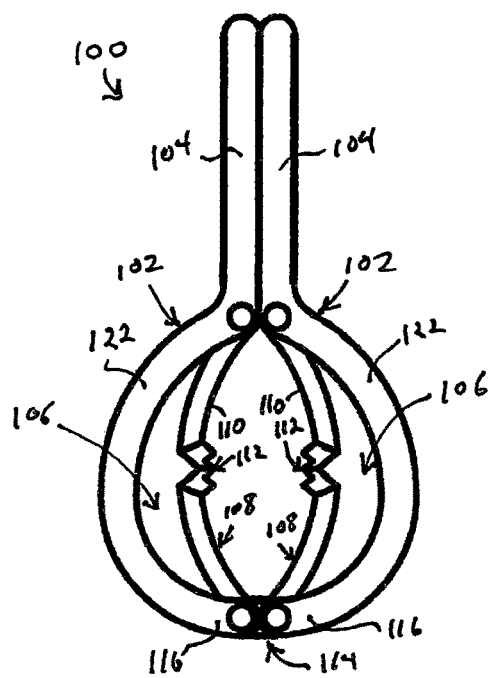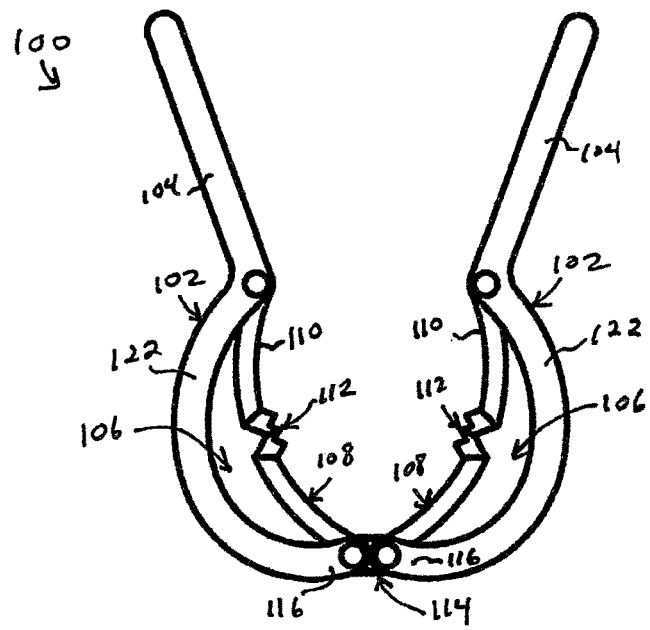
FIG. 1
FIG. 2
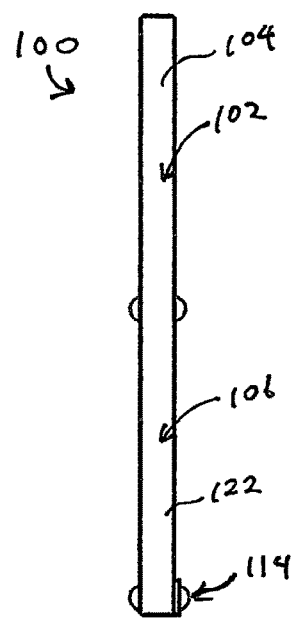
FIG. 3

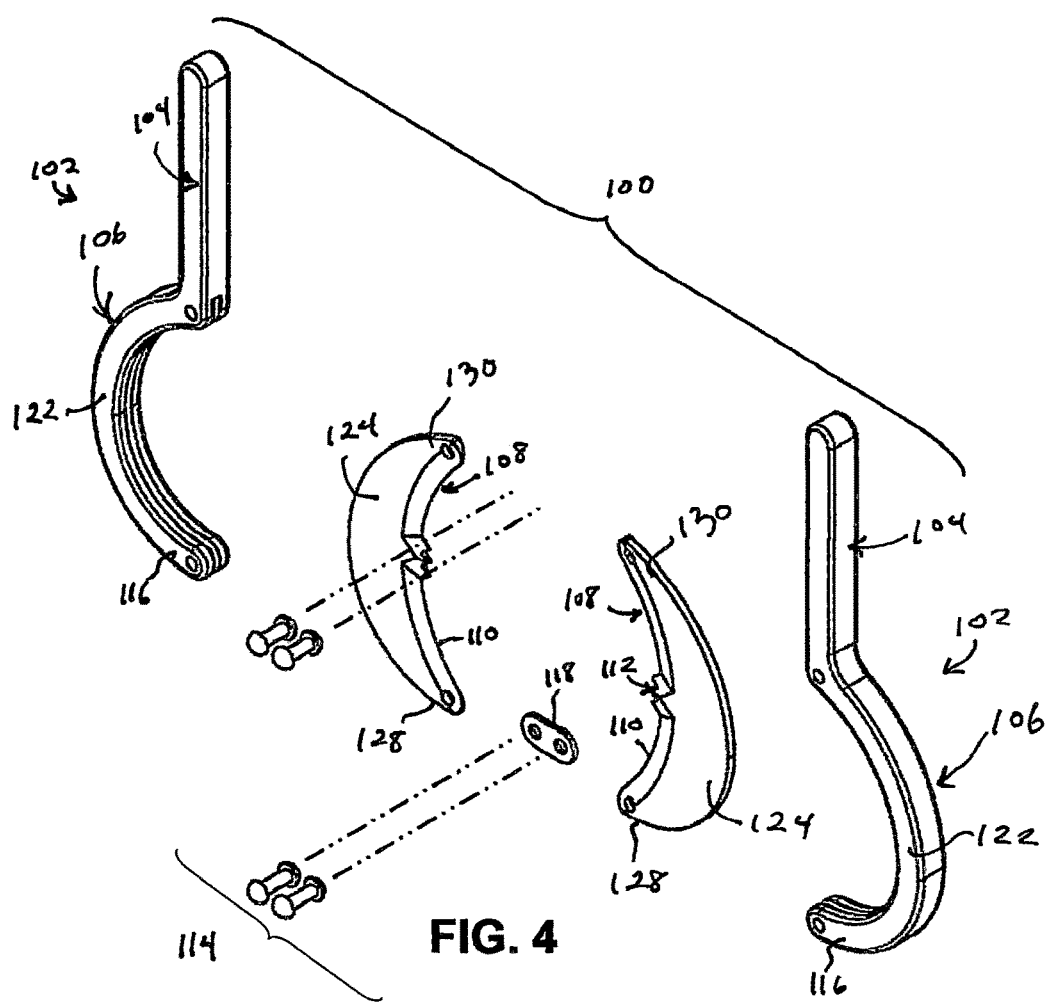
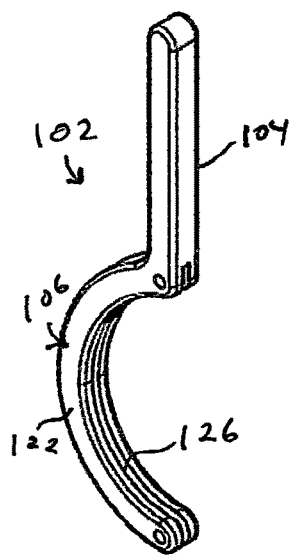
FIG. 5
FIG. 6
FIG. 7

HAND TOOL FOR CUTTING AND CORING AN AVOCADO AND A METHOD OF USING SAME

FIELD OF THE INVENTION

The present invention relates generally to hand tools and, more particularly, to a hand tool usable for cutting and coring an avocado, and a method of using same.

BACKGROUND OF THE INVENTION

There are numerous examples of kitchen hand tools on the market usable for cutting in two and\or coring avocados. Some of these commercially available hand tools typically comprise a handle portion and a tool portion extending from one end of the handle portion, with the tool portion being adapted for either cutting the skin and flesh of an avocado, or removing the seed, or coring, the avocado. Other examples of such kitchen hand tools comprise a handle portion, and both a tool for cutting the skin and flesh of an avocado, such as a blade extending from one end of the handle portion, and a coring tool typically at an opposite end of the handle portion or, alternatively, located adjacent the cutting tool.

Invariably, the cutting and coring tools of these hand tools are two distinct portions thereof. Consequently, a user must use in alternance each one of these distinct portions of the hand tool, with each requiring their respective manipulations, for cutting than removing the seed of an avocado.

These manipulations applied in alternance can become a painful strain on the hands of the user when a series of avocados must be cut and cored using these kitchen hand tools.

Thus, there is a need on the market for an improved hand tool for cutting and coring an avocado that avoids the aforementioned disadvantages.

In a broad aspect, the present invention provides such an improved hand tool, and a method of using same.

SUMMARY OF THE INVENTION

In a broad aspect, the present invention provides a hand tool for cutting and coring an avocado, and a method of using same.

According to an embodiment of the present invention, the hand tool comprises a pair of hand tool elements. Each one in the pair of hand tool elements has an elongated configuration. Furthermore, each one in the pair of hand tool elements includes a handle portion, a tool portion extending distally away from the handle portion, and a concave blade extending sidewardly inwardly relative to a longitudinal axis of the tool portion, and defining a cutting edge along at least one portion of the concave blade.

Furthermore, at least one avocado seed engaging portion is located along, and is protruding radially distally away from, the concave blade.

The hand tool further comprises a pivotable junction joining a distal end of each tool portion relative to its respective handle portion so as to have the concave blade of each tool portion oppositely facing one another in a mirrored fashion when the pair of hand tool elements are located parallel to one another.

The hand tool is movable between a closed position and an open position, wherein each handle portion is closer to one another when in the closed position than in the open position.

Thus, when the hand tool is in the open position, an avocado may be freely positioned substantially centrally between the opposed concave blades.

And when the hand tool is moved towards the closed position, the concave blades cut through at least a portion of the skin and flesh on opposed sides of the avocado, and the avocado seed engaging portions engage opposed sides of the seed thereof.

Hence a user may remove opposed halves of the avocado skin and flesh while retaining the avocado seed between the avocado seed engaging portions of the hand tool.

A method of cutting and coring an avocado using a hand tool is also described.

Thus the present invention describes a hand tool for cutting and coring an avocado that significantly reduce the manipulations required for such a task, compared to commercially available hand tools adapted to accomplish the same task.

Other advantages, novel features and alternate embodiments of the present invention will be more apparent from the following drawings and detailed description.

BRIEF DESCRIPTION OF THE DRAWINGS

FIG. 1, in a side plan view, illustrates an embodiment of a hand tool for cutting and coring an avocado, according to the present invention, here shown in a closed position;

FIG. 2, in a side plan view, illustrates the hand tool in FIG. 1, here shown in an open position;

FIG. 3, in a longitudinal edge plan view, illustrates the hand tool in FIG. 1, FIG. 4, in a perspective exploded view, illustrates the hand tool in FIG. 1, FIG. 5, in a perspective view, illustrates an embodiment of a hand tool element, here shown having a blade element removed therefrom;

FIG. 6, in a longitudinal edge plan view, illustrates the hand tool element in FIG. 5;

FIG. 7, in a longitudinal cross-section view, illustrates the hand tool element in FIG. 6 taken along section line VII;

DETAILED DESCRIPTION OF THE INVENTION

Figure 8:
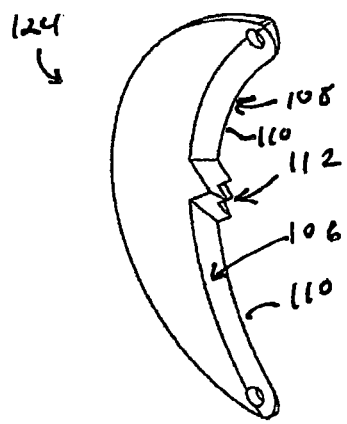
FIG. 8, in a perspective view, illustrates an embodiment of a blade element.
Figure 9:
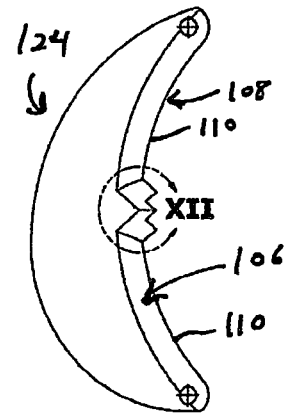
FIG. 9, in a side plan view, illustrates the blade element in FIG. 8.
Figure 10:
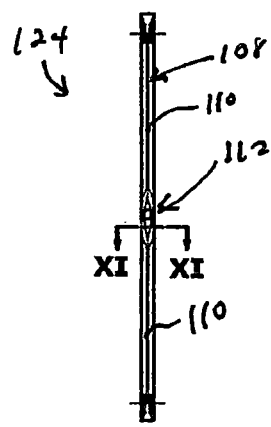
FIG. 10, in a front edge view, illustrates the blade element in FIG. 8.
Figure 11:
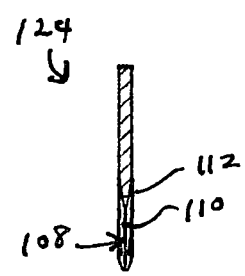
FIG. 11, in a top cross-section view, illustrates the blade element in FIG. 10 taken along section line XI.

FIGS. 1 to 3 illustrate various aspects of an embodiment, according to the present invention, of a hand tool 100 for cutting and coring an avocado 200.

The hand tool 100 comprises a pair of hand tool elements 102. Each one in the pair of hand tool elements 102 has an elongated configuration. Furthermore, each one in the pair of hand tool elements 102 includes a handle portion 104, a tool portion 106 extending distally away from the handle portion 104, and a concave blade 108 extending sidewardly inwardly relative to a longitudinal axis of the tool portion 106, and defining a cutting edge 110 along at least one portion of the concave blade 108.

Figure 15:
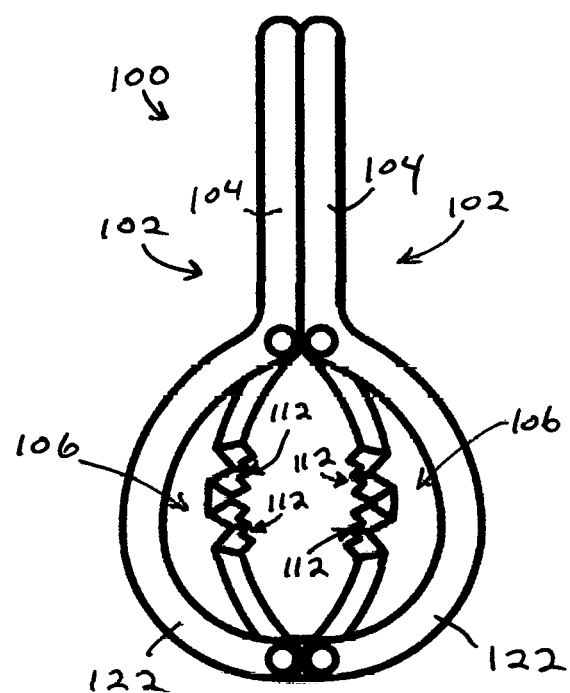
FIG. 15, in a side plan view, illustrates the hand tool in FIG. 1, here shown including two avocado engaging portions along each concave blade.

Furthermore, as illustrated for example in FIGS. 1 and 15, each one in the pair of hand tool elements 102 includes between one and two avocado seed engaging portions 112 located substantially adjacently centrally along the concave blade 108, and are protruding radially distally away there from. As would be obvious to someone familiar with concave blades, and inferred from the figures attached, the concave blade is inherently oriented (or facing) towards one imaginary "common focal point". Furthermore, the cutting edge 110 thereof extends substantially linearly along the concave shape of the concave blade. Thus, each avocado seed engaging portions 112 along the blade inherently protrudes substantially towards this "common focal point".

The hand tool 100 further comprises a pivotable junction 114 joining a distal end 116 of each tool portion 106 relative to its respective handle portion 104 so as to have the concave blade 108 of each tool portion 106 oppositely facing one another in a mirrored fashion when the pair of hand tool elements 102 are located parallel to one another, as illustrated in FIG. 1.

The hand tool 100 is movable between a closed position and an open position, as illustrated in FIGS. 1 and 2 respectively, wherein each handle portion 104 is closer to one another when in the closed position than in the open position.

Figure 13:
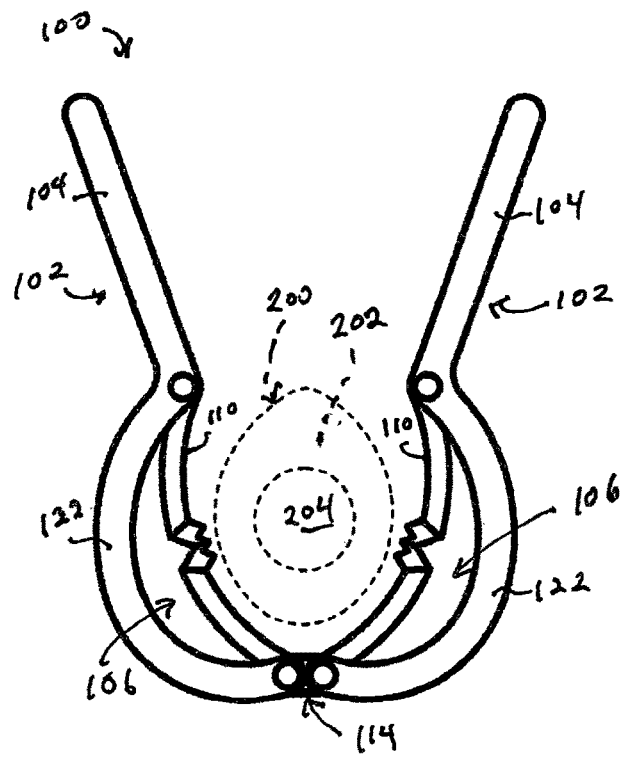
FIG. 13, in a side plan view, illustrates the hand tool in FIG. 1, here shown in an open position and ready to engage an avocado.

Thus, as illustrated in FIGS. 13, when the hand tool 100 is in the open position, an avocado 200 may be freely positioned substantially centrally between the opposed concave blades 108.

Figure 14:
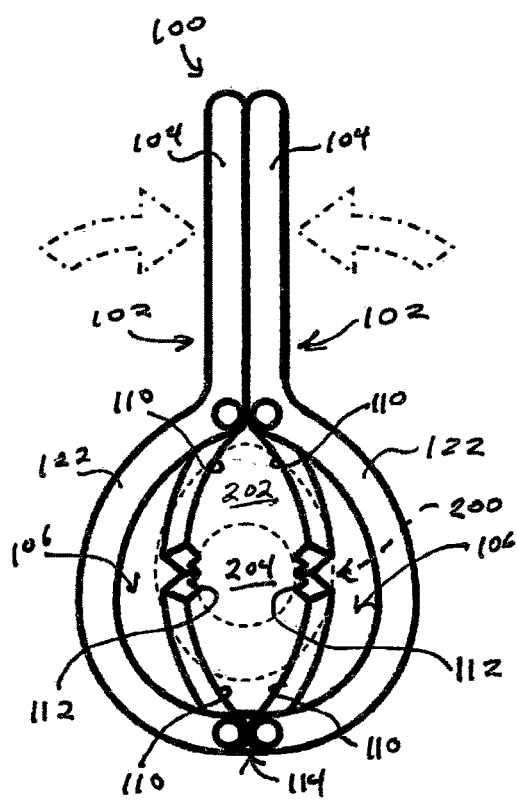
FIG. 14, in a side plan view, illustrates the hand tool in FIG. 13, here shown in a closed position wherein the skin and flesh of the avocado are cut by the opposed blade elements, and the seed thereof is engaged and retained between the opposed avocado seed engaging portions of the blade elements.

And when the hand tool 100 is moved towards the closed position, as illustrated in FIG. 14, the concave blades 108 cut through at least a portion of the skin and flesh 202 on opposed sides of the avocado 200, and the avocado seed engaging portions 112 engage opposed sides of the seed 204 thereof.

Hence a user may remove opposed halves of the avocado skin and flesh 202 while retaining the avocado seed 204 between the avocado seed engaging portions 112 of the hand tool 100.

In some embodiments of the invention, as best illustrated in FIG. 4, the pivotable junction 114 includes a substantially short link member 118 having distally opposed ends thereof pivotably connected to corresponding to the end portions 116 of the tool portions 106.

As illustrated in FIG. 4, the link member 118 may be connected to the tool portions 106 through any known suitable means such as pivot rivets, as illustrated, nut and screw combinations, snap-in compatible pivot portions provided at the distal ends 116 of the tool portions 106, or the likes.

In some embodiments of the invention, as illustrated in FIGS. 1, 2, and 8 to 11, each concave blade 108 includes one avocado seed engaging portion 112 substantially centered relative thereof, with two cutting edges 110 extending distally on each side of the avocado seed engaging portion 112.

In some embodiments of the invention, each avocado seed engaging portion 112 defines one or more pointed portions 120 oriented radially distally away relative to its respective concave blade 108.

Figure 12:
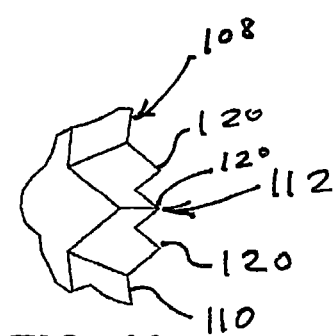
FIG. 12, in a cut away view, illustrates an avocado seed engaging portion of the blade element in FIG. 9, taken within section line XII thereof.

Preferably, as best illustrated in FIG. 12, each avocado seed engaging portion 112 defines three pointed portions 120 located adjacently relative to one another along their respective concave blade 108.

In some embodiments of the invention, as best illustrated in FIGS. 4 to 7 inclusively, each tool portion 106 includes a support member 122 extending from the handle portion 104, and the concave blade 108 is represented by a blade element 124 connected to the support member 122.

As illustrated in FIG. 4, the blade element 124 may have a crescent configuration wherein an outer rounded portion thereof opposite the concave blade 108 being engaged in a suitably shaped groove 126 defined along an inner portion of the support member 122.

Furthermore, a pointed lower end 128 of each blade element 124 maybe cooperatively connected to its respective support member 122 through pivot rivets, or the likes, used to connect the link member 118 of the pivotable junction 114 thereto. Similar connection means may be used to connect a pointed upper end 130 of each blade element 124. Other connection configurations for connecting each blade element 124 to its respective support member 122 are also possible.

Alternatively, in some embodiments of the invention (not shown in the figures), each hand tool element 102 is made of a single piece element, for example, using a suitable injection molding process.

The various components of the hand tool 100 may be made of a suitably rigid material, or combination of suitably rigid materials known in the art of kitchen hand tools such as, for examples, plastic, aluminum, a suitable metal alloy, ceramic, and the likes.

It is also contemplated that the hand tool 100 may have its various components disassembled by hand without the use of tools, so as to allow a thorough wash. For example, the pivotable link 114 and blade elements 124 may be connected to the other components of the hand tool 100 through relatively small screw and wingnut combinations, snap-in actions, and the likes.

A method of cutting and coring an avocado 200 using a hand tool 100 movable between an open and a closed position will now be described.

With the hand tool 100 in the open position, the method comprises in a first step, positioning the avocado 200 between opposed concave blades 108 thereof, as illustrated in FIG. 13.

In a second step, moving the hand tool 100 to the closed position, as illustrated in FIG. 14, so as to at least partially cut the skin and flesh 202 on opposed sides of the avocado 200, and engaging and retaining the avocado seed 204 between opposed avocado seed engaging portions 112 protruding from a respective one of the opposed concave blades 108.

In a third step, removing opposed halves of the skin and flesh 202 of the avocado 200, while the seed 204 is retained between the opposed avocado seed engaging portions 112 of the hand tool 100.

In some embodiments of the method, before the third step, the method further comprises moving the hand tool 100 in the open position, followed by at least partially rotating the avocado 200 about an imaginary transversal axis relative to the opposed concave blades 108, then finally moving the hand tool 100 in the closed position.

In some embodiments of the method, the third step of removing further includes for each half of the avocado skin and flesh 202, at least partially rotating the half about an imaginary transversal axis relative to the opposed concave blades 108, followed with pulling the latter away from the seed 204.

Thus there has been described a hand tool 100 for cutting and coring an avocado 200 that significantly reduce the manipulations required for such a task, compared to commercially available hand tools adapted to accomplish the same task.

Although the present invention has been described herein above by way of preferred embodiments thereof, it can be modified, without departing from the spirit and nature of the subject invention.

What is claimed:

1. A hand tool for cutting and coring an avocado, comprising:
    a pair of hand tool elements, each one in the pair of hand tool elements having an elongated configuration and including:
        a handle portion,
        a tool portion extending distally away from the handle portion,
        a concave blade extending sidewardly inwardly relative to a longitudinal axis of the tool portion, and defining a cutting edge along at least one portion of the concave blade,
        at least one avocado seed engaging portion located along, and protruding substantially radially distally away from, the concave blade;
    a pivotable junction joining a distal end of each tool portion relative to each respective handle portion so as to have the concave blade of each tool portion oppositely facing one another in a mirrored fashion when the pair of hand tool elements are located parallel to one another;
    wherein the pivotable junction includes a substantially short link member having distally opposed ends thereof pivotably connected to the corresponding end portions of the tool portions;
    wherein the hand tool is movable between a closed position and an open position, wherein each handle portion is closer to one another when in the closed position than in the open position;
    wherein, when the hand tool is in the closed position, each handle portion is parallel to, and touching, one another; and
    wherein
        when the hand tool is in the open position, an avocado is positioned substantially centrally between the opposed concave blades, and
        when the hand tool is moved towards the closed position, the concave blades cut through at least a portion of skin and flesh on opposed sides of the avocado, and the avocado seed engaging engage opposed sides of the seed thereof;
    whereby a user is able to remove opposed halves of the avocado skin and flesh while retaining the avocado seed between the avocado seed engaging portions of the hand tool.

2. The hand tool as defined in claim 1 wherein the at least one avocado seed engaging portion comprises one avocado seed engaging portion located centrally along a centered portion of the respective concave blade, with two cutting edges extending distally on each side of the avocado seed engaging portion.

\* \* \* \* \*